(12) United States Patent
Landau

(10) Patent No.: US 10,182,678 B2
(45) Date of Patent: Jan. 22, 2019

(54) MANUAL BREWING PRESS

(71) Applicant: Sergio Landau, Laguna Niguel, CA (US)

(72) Inventor: Sergio Landau, Laguna Niguel, CA (US)

( * ) Notice: Subject to any disclaimer, the term of this patent is extended or adjusted under 35 U.S.C. 154(b) by 142 days.

(21) Appl. No.: 15/244,117

(22) Filed: Aug. 23, 2016

(65) Prior Publication Data

US 2018/0055274 A1 Mar. 1, 2018

(51) Int. Cl.
| | |
|---|---|
| *A47J 31/38* | (2006.01) |
| *A47J 31/00* | (2006.01) |
| *A47J 31/46* | (2006.01) |
| *A47J 31/06* | (2006.01) |
| *A23F 5/26* | (2006.01) |

(52) U.S. Cl.
CPC ............. *A47J 31/38* (2013.01); *A23F 5/262* (2013.01); *A47J 31/0663* (2013.01)

(58) Field of Classification Search
CPC ........ A47J 31/38; A47J 31/0663; A23F 5/262
See application file for complete search history.

(56) References Cited

U.S. PATENT DOCUMENTS

| | | | | |
|---|---|---|---|---|
| 5,622,099 A * | 4/1997 | Frei | ..................... | A47J 31/3671 99/287 |
| 5,638,741 A * | 6/1997 | Cisaria | ................ | A47J 31/0684 99/295 |
| 5,657,683 A * | 8/1997 | Sandei | ................ | A47J 31/3609 99/287 |
| 7,320,274 B2 * | 1/2008 | Castellani | ........... | A47J 31/0673 99/289 R |
| 2004/0031394 A1 * | 2/2004 | Yoakim | ............... | A47J 31/0668 99/279 |
| 2007/0227363 A1 * | 10/2007 | Verna | ..................... | A47J 31/38 99/279 |
| 2012/0017767 A1 * | 1/2012 | Samso Besora | ........ | A47J 31/38 99/302 R |
| 2012/0199011 A1 * | 8/2012 | Cheng | ................. | A47J 31/3628 99/295 |

(Continued)

FOREIGN PATENT DOCUMENTS

DE 20217495 * 1/2003

OTHER PUBLICATIONS

Derwent Abstract of DE20217495 published Jan. 2003.*

*Primary Examiner* — Anthony J Weier
(74) *Attorney, Agent, or Firm* — The Keith Miller Law Group; Keith A. Miller

(57) ABSTRACT

This invention provides a novel solution for a device and method including a hand-operated brewing press 100 and a separate brewing container 120 configured to brew a beverage. The beverage is brewed via the hand-operated brewing press 100 by first attaching the portafilter 126 container a portion of the pre-ground brewing medium onto a press plate 130. Next, the cylinder is attached onto the portafilter 126. Next, a portion of hot fluid 129 is poured into the cylinder. Next a piston 122 is inserted into the cylinder. Next, a force is applied to the lever 110 resulting in the piston 122 sliding downward inside the cylinder applying a pressure to the portion of hot fluid 129, the portion of hot fluid 129 is forced to flow into the portafilter 126 and through the portion of the pre-ground brewing medium 127 to produce the brewed beverage.

13 Claims, 20 Drawing Sheets

(56) References Cited

U.S. PATENT DOCUMENTS

| | | | | |
|---|---|---|---|---|
| 2013/0052321 A1* | 2/2013 | Liu | .................... | A47J 31/4403 |
| | | | | 426/433 |
| 2013/0206012 A1* | 8/2013 | Morin | ................ | A47J 31/3614 |
| | | | | 99/287 |
| 2015/0327712 A1* | 11/2015 | Samso Besora | ........ | A47J 31/38 |
| | | | | 426/425 |
| 2018/0125285 A1* | 5/2018 | Samso Besora | ........ | A47J 31/38 |
| 2018/0125286 A1* | 5/2018 | Samso Besora | ........ | A47J 31/38 |

\* cited by examiner

FIG 7
BREWING PRESS ASSEMBLY
1 Insert Post (140) with Lever (110) into the Base (150)
↑ 101 Upward Direction
↓ 102 Downward Direction
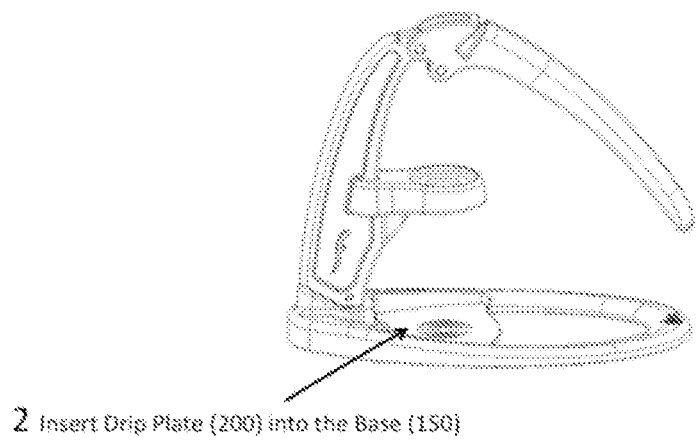
2 Insert Drip Plate (200) into the Base (150)

FIG 9
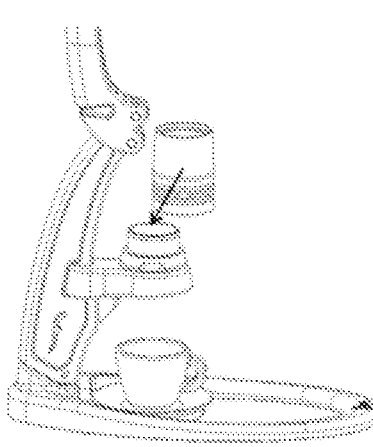
2 Insert Cylinder (124) onto Portafilter (126)
↑ 101 Upward Direction
↓ 102 Downward Direction
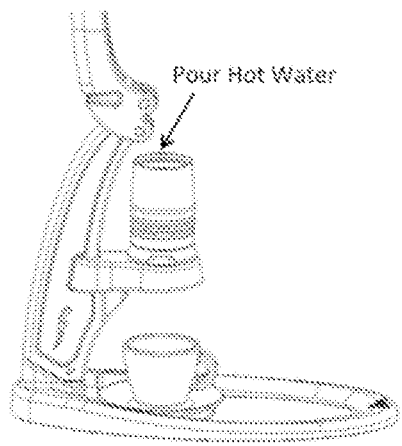
3 Fill the Cylinder (124) with hot water

150 BASE

MANUAL BREWING PRESS

FIELD OF THE INVENTION

This invention is in the field of devices and methods to make beverages and in particular a hand operated press and method to brew an espresso and other beverages.

BACKGROUND OF THE INVENTION

People enjoy drinking brewed beverages such as tea and espresso. Brewed beverages require a brewing medium, for example tealeaves or coffee grinds and forcing a hot fluid through the brewing medium. The ideal pressure to force the hot fluid through the brewing medium to brew a cup of espresso is typically in the range 5 to 20 BAR. Getting the hot fluid to achieve this pressure range is highly desired particularly in a compact, easy to use, hand operated mechanism.

This invention provides a novel solution for a hand operated brewing press and method that enables a user to brew a cup of a beverage, such as espresso. The hand operated brewing press is optimized for simple use without the need of complex mechanisms such as pumps, electric power, springs, locks, or valves.

BRIEF SUMMARY OF THE INVENTION

One embodiment of the invention includes a hand-operated brewing press configured to brew a beverage. The brewing press comprises a press stand and a brewing container. The press stand comprises a base with a first mating feature, a post with a second mating feature configured to mate with the first mating feature of the base, a press plate configured to mate with a second mating surface of the post, wherein the second mating surface of the post is positioned between the first end of the post and a second end of the post, a lever configured to mate by a first pin to the second end of the post so that the second end of the lever rotates about the first pin, a bearing roller configured to mate with a second pin at the first end of the post wherein the bearing roller is configured to smoothly rotate about the second pin. The brewing container comprises a portafilter, a cylinder, and a piston wherein the brewing container is configured to rest on the press plate and is separable from the press plate to enable cleaning, repair, and replacement.

The base is made of an annular protrusion with a mating feature. The post is configured with a first end including a mating feature that mates with the mating feature of the base. Next a press plate is configured to mate with a second mating surface of the post. The second mating surface of the post is positioned between the first end of the post and a second end of the post. Next, a lever is configured to mate by a first pin to the second end of the post so that the second end of the lever rotates about the first pin. The lever includes a bearing roller configured to mate with a second pin at the first end of the post wherein the bearing roller is configured to smoothly rotate about the second pin. Finally a brewing container is placed on top of the press plate wherein the brewing container includes a portafilter, a cylinder, and a piston. Each of these components is designed to assemble together without the need for fasteners or locks. For example, each of the mating features described include slip fit features enabling the components to mate together without the need for fasteners.

Another embodiment of the invention includes a method for brewing a beverage with a hand-operated brewing press. First the portafilter is assembled onto a press plate with a portion of a pre-brewed medium in it. Either before or after assembling the portafilter to the press plate a portion of the pre-brewed medium is added. Next a cylinder is attached onto the portafilter by sliding a first end of an annular wall of the cylinder onto an outside surface of a first end of an annular wall of the portafilter. Next, a portion of hot fluid is poured into the cylinder. Next a piston is inserted into the cylinder by inserting a first end of an outer cylindrical wall of the piston into an inside surface of a second end of a cylindrical wall of the cylinder. Next, a person applies a force to a lever resulting in the lever rotating in a downward direction resulting in the piston sliding downward along the inside surface of the second end of the cylindrical wall of the cylinder applying a pressure to the portion of hot fluid inside the cylinder, wherein the portion of hot fluid inside the cylinder is forced to flow into the portafilter and through the portion of the pre-brewed medium and through the filter of the portafilter to produce the brewed beverage. Finally the brewed beverage is captured in a cup as the brewed beverage flows out of the brewing container.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 7 illustrates a method for assembling a post with a lever into the base in accordance with the teachings of the present invention;

FIG. 9 illustrates a method for using the hand operated brewing press including inserting the cylinder in accordance with the teachings of the present invention;

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
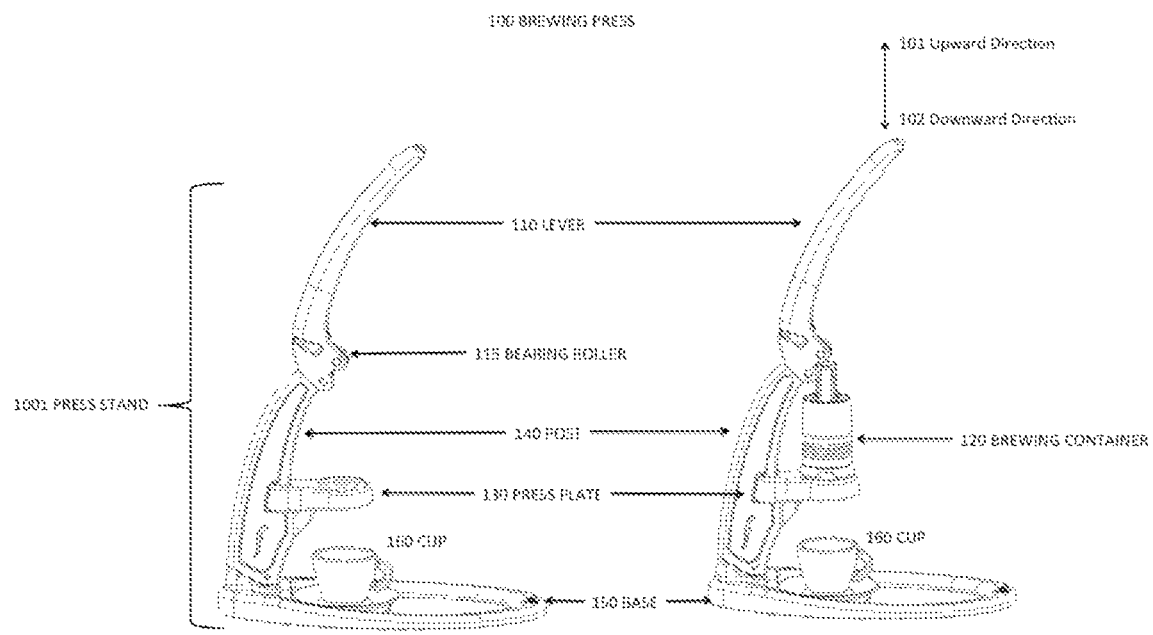
FIG. 1 illustrates the hand operated brewing press in accordance with the teachings of the present invention.
Figure 10:
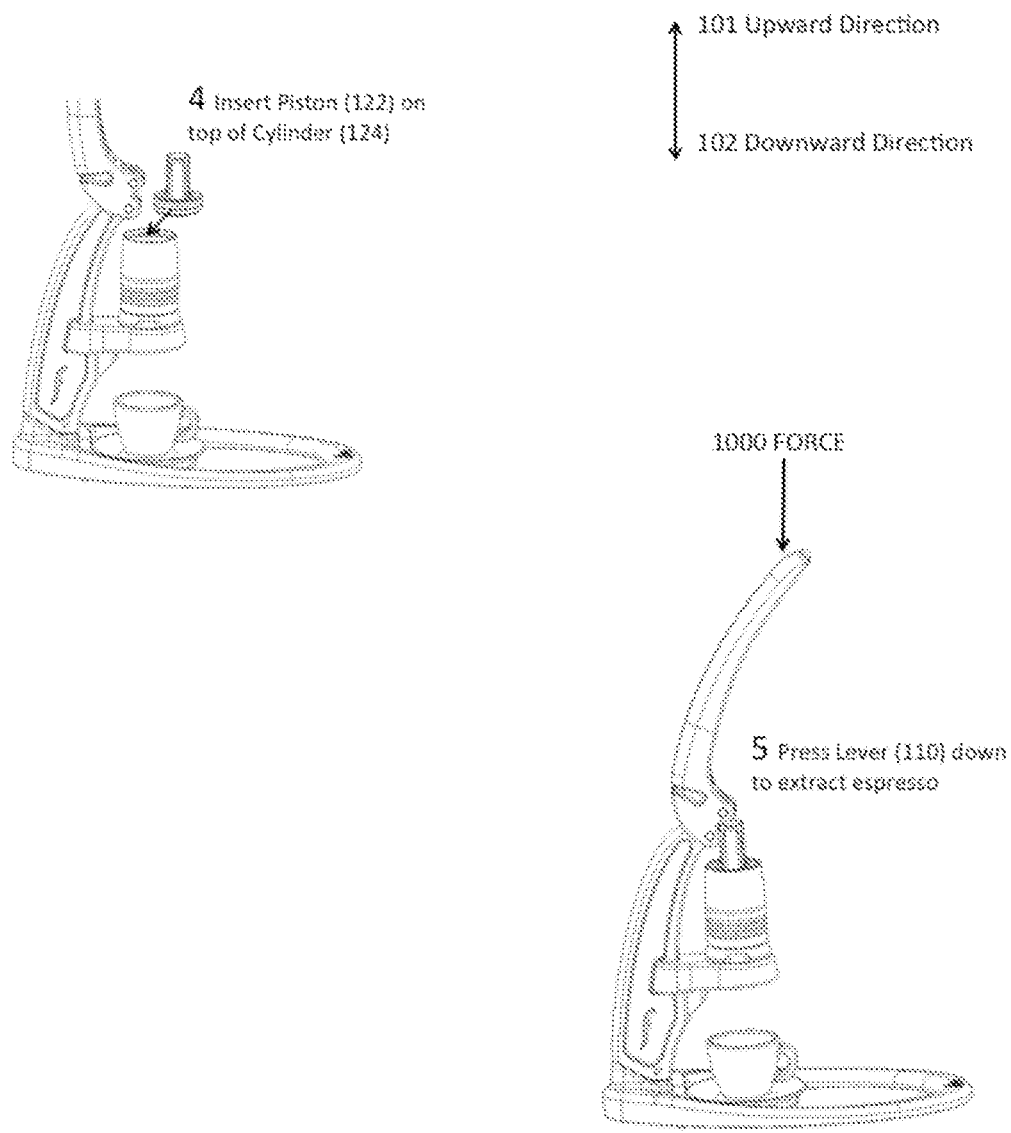
FIG. 10 illustrates a method for using the hand operated brewing press including inserting a piston into the cylinder and pressing the lever to extract the brewed fluid in accordance with the teachings of the present invention.
Figure 11:
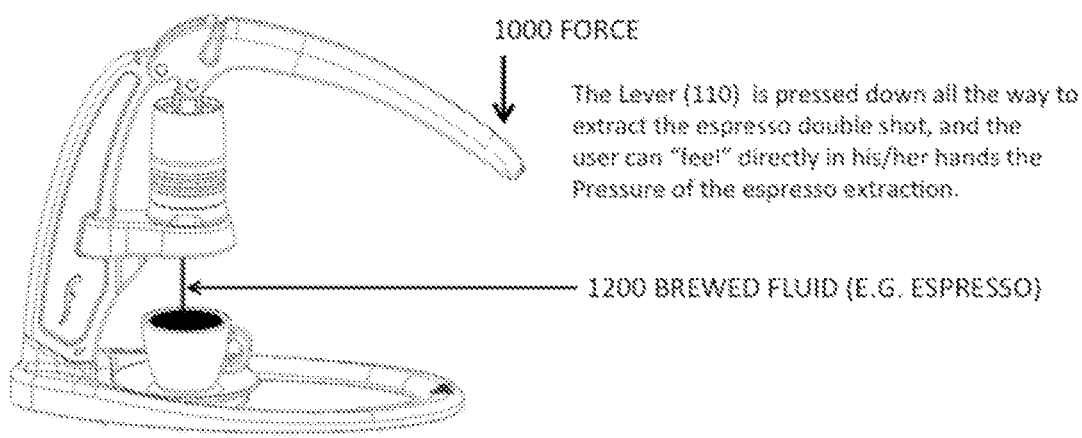
FIG. 11 illustrates a method for using the hand operated brewing press including extracting the brewed fluid into a cup.

FIG. 1 illustrates the brewing press 100 that includes a press stand 1001 and a brewing container 120. The press stand 1001 comprises a base 150, post 140, press plate 130, brewing container 120, and lever 110. The brewing press 100 is configured such that a cup 160 is placed underneath the press plate 130 while a pre-ground brewing medium 127 is placed inside a portafilter 126 within the brewing container 120 and a hot fluid 129 inside the brewing container 120. A force is applied to the lever 110 in a downward direction 102 that causes a piston 122 to apply a pressure to the hot fluid 129 (e.g. as shown in FIG. 10). The hot fluid 129 is then forced to flow past the pre-ground brewing medium 127 to yield a brewed fluid 1200. The brewed fluid 1200 then flows out of a nozzle in the brewing container 120 and is captured in the cup 160. In one example the pre-ground brewing medium 127 may consist of tealeaf grounds, coffee grounds, chocolate grounds, or any other form of the pre-ground brewing medium 127 that benefits from being brewed with a hot fluid 129. For example, the hot fluid 129 may consist of water, milk, alcohol, or any other type of fluid 129 that may be used to brew the pre-ground brewing medium 127. The brewing container 120 may then be removed from the brewing press 100 to clean any residue left inside the portafilter 126, the cylinder 124, or the piston 122 (e.g. as shown if FIG. 2).

A novel feature of this invention includes the brewing container 120 (including the portafilter 126, the cylinder 124, or the piston 122) that can be completely removed from the brewing press 100 for simple cleaning, repair, or replacement. Further all of the other components of the brewing press 100 do not come in contact with the pre-ground brewing medium 127 or the hot fluid 129. The removable brewing container 120 enables the components to be removed for easy cleaning, replaced when components break, or even allow multiple brewing containers to be used. For example one brewing container 120 may be used to brew caffeinated coffee and a second brewing container 120 can be used to brew decaffeinated coffee. Multiple brewing containers could be used to quickly prepare multiple servings. For example the brewing press 100 could be used at a coffee shop, or at a home with multiple coffee drinkers, to quickly brew multiple cups of coffee by preparing multiple brewing containers at a time. For example each of these multiple cups could be prepared with different flavors, strengths, or types of brewed beverages. A first cup could be brewed using the hand operated brewing press 100, followed by a second cup, a third cup, and so on. The brewed beverage can also be varied in intensity or strength by changing the size of pre-ground brewing medium grounds and by how tightly together they are compacted which will determine the range of force applied to the lever 110, which in turn will determine the pressure applied to the hot fluid 129. Likewise the intensity of the brewed beverage can be varied by changing the amount of the pre-ground brewing medium placed inside of the portafilter 126. The brewed beverage can also be varied by changing the time required to pull the lever 110 downward. For example, a minimum given force will always be required to force the fluid 129 to flow through the pre-ground brewing medium 127. However the flavor or intensity of the pre-ground brewing medium 127 will vary by the amount of force applied to the lever 110, that can be controlled by the time it takes to bring the lever 110 all the way down. For example, a typical espresso made with a typical portion of coffee grounds would require a pressure between 8 and 15 BAR which approximately corresponds respectively to 20 and 40 seconds to bring the lever 110 all the way down to yield a cup of espresso. 20 seconds would yield a regular cup of espresso with lighter intensity and perhaps no crema on top, whereas 40 seconds would yield a typical cup of espresso with stronger intensity and more crema at the top (e.g. including a higher portion of caffeine). This invention enables a user to dial in the brewing process to yield a preferred taste of the brewed beverage.

Figure 2:
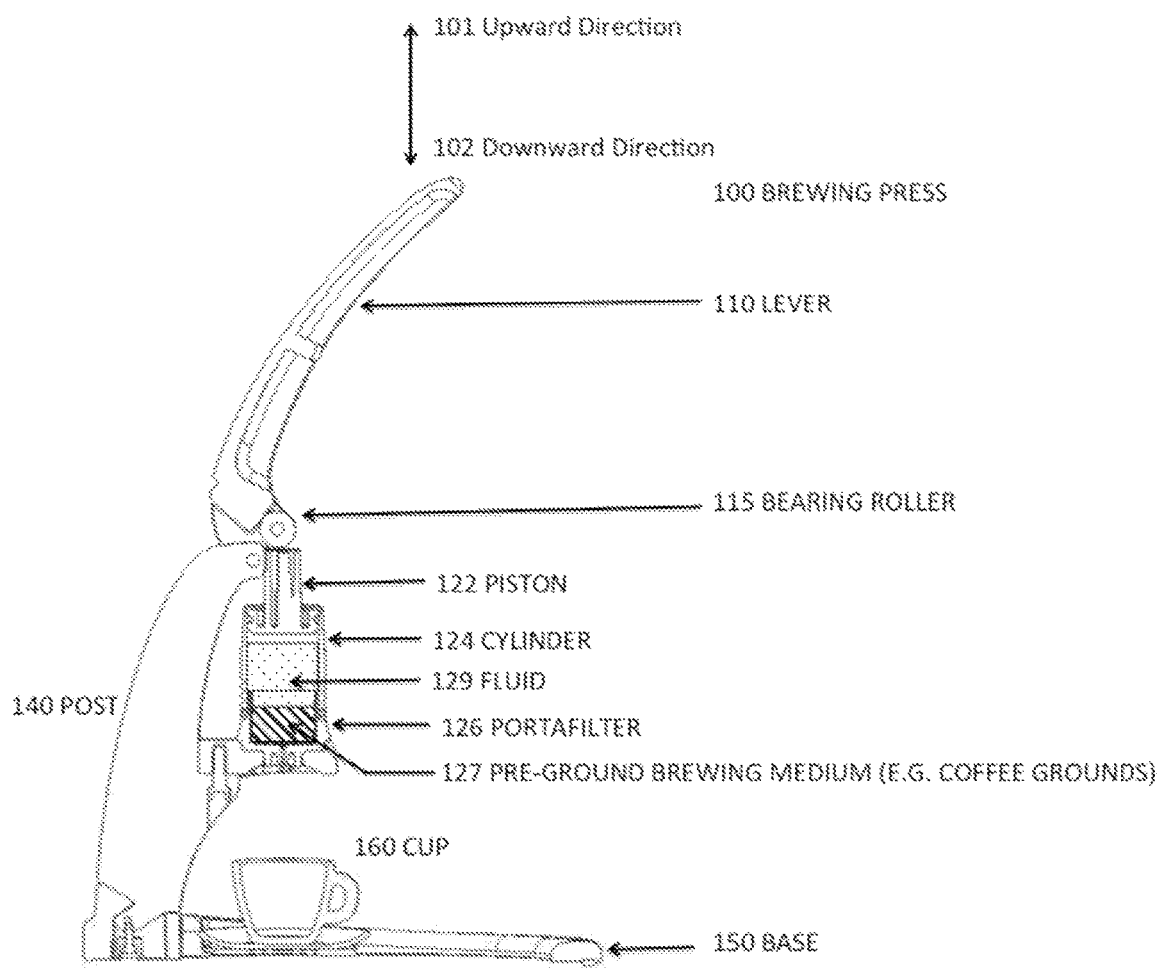
FIG. 2 illustrates a cross sectional view of the hand operated brewing press in accordance with the teachings of the present invention.

FIG. 2 illustrates a side and cross sectional view of the brewing press 100. The post 140 is assembled to the base 150 by use of a mating feature of the base 150 that mates with a mating feature of the post 140. The mating features are intended to fit together by an interference fit. Optionally a fastener, such as a screw, may be used to join the base 150 and post 140 together. The mating feature of the post 140 may be configured to have a protrusion that is inserted into recess in the base 150. FIG. 2 illustrates how a downward force on the lever 110 would only push the post 140 and base 150 more intimately together.

Figure 16:
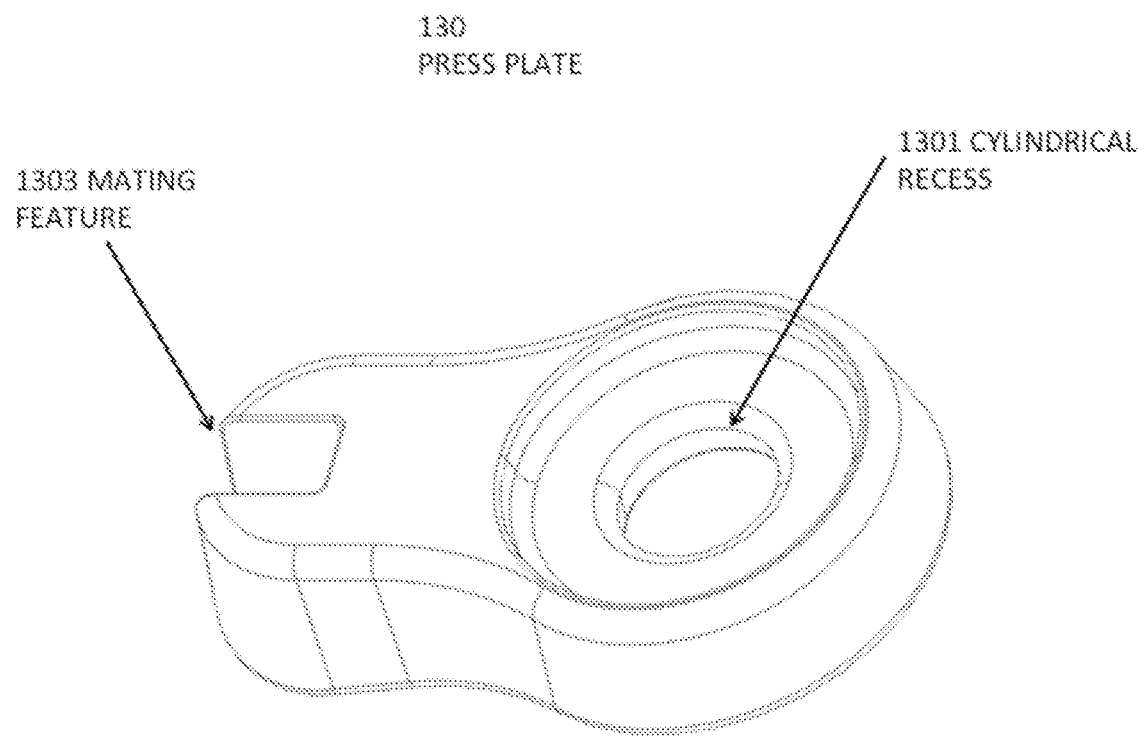
FIG. 16 illustrates a press plate in accordance with the teachings of the present invention.

The press plate 130 is already pre-attached by a mating feature of the press plate 130 to a second mating feature on the post 140. The second mating feature on the post 140 is placed between a first and second end of the post 140, such that the press plate 130 will be high enough from the base 150 to place a typical cup 160. For example, the cup 160 may be a coffee mug or travel mug suitable to hold one or more cups of fluid 129. FIG. 16 illustrates the press plate 130 that includes a mating feature and a cylindrical recess. The cylindrical recess of the press plate is configured such that the cylindrical protrusion 180 of the brewing container 120 (referring to FIG. 4) will firmly fit within the cylindrical recess of the press plate. The cylindrical recess of the press plate and the cylindrical protrusion 180 of the brewing container 120 are configured such that fasteners are not needed to secure the brewing container 120 to the press plate. For example, the diameter of the cylindrical protrusion 180 of the brewing container 120 is configured such that it will have a slip fit with the diameter of the cylindrical recess of the press plate.

FIG. 2 also illustrates the brewing container 120 that is comprised of a portafilter 126, cylinder 124, and piston 122.

The portafilter 126 may be filled with coffee grounds, or another form of the pre-ground brewing medium 127 and the cylinder 124 is filled with a hot fluid 129. The piston 122 is placed on top of the cylinder 124 to contain the fluid 129 in the cylinder 124. The lever 110 is connected to the post 140 at a second end of the post 140 by a pin. The connection of the post 140 is configured such that the lever 110 is able to rotate about the pin. For example, the lever 110 can be rotated in a downward direction 102 to push the piston 122 in the downward direction 102. Likewise, the lever 110 is free to rotate the lever 110 in an upward direction 101 such that the piston 122 can be inserted in the brewing container 120 and the brewing container 120 can be freed from the base plate. The brewing container 120 can be removed from the press plate by just pulling it upwards from the slip fit of the cylindrical recess of the press plate. The lever 110 also includes a bearing roller configured to mate with a second pin at the first end of the post 140. The bearing roller enables the downward force applied to the lever 110 to be transferred to the piston 122. The bearing roller is configured to smoothly rotate about the second pin to prevent the lever 110 from sticking to the top surface of the piston 122. The top surface of the piston 122 may include a hardened stainless steel surface, or other hardened material that is strong enough to take the force and provide a smooth surface for the bearing surface to roll against. The cup 160 is placed underneath the assembly of the base plate. The brewing press 100 configured such that the brewed fluid 1200 will flow out of the brewing container 120 and into the cup 160.

Figure 3:
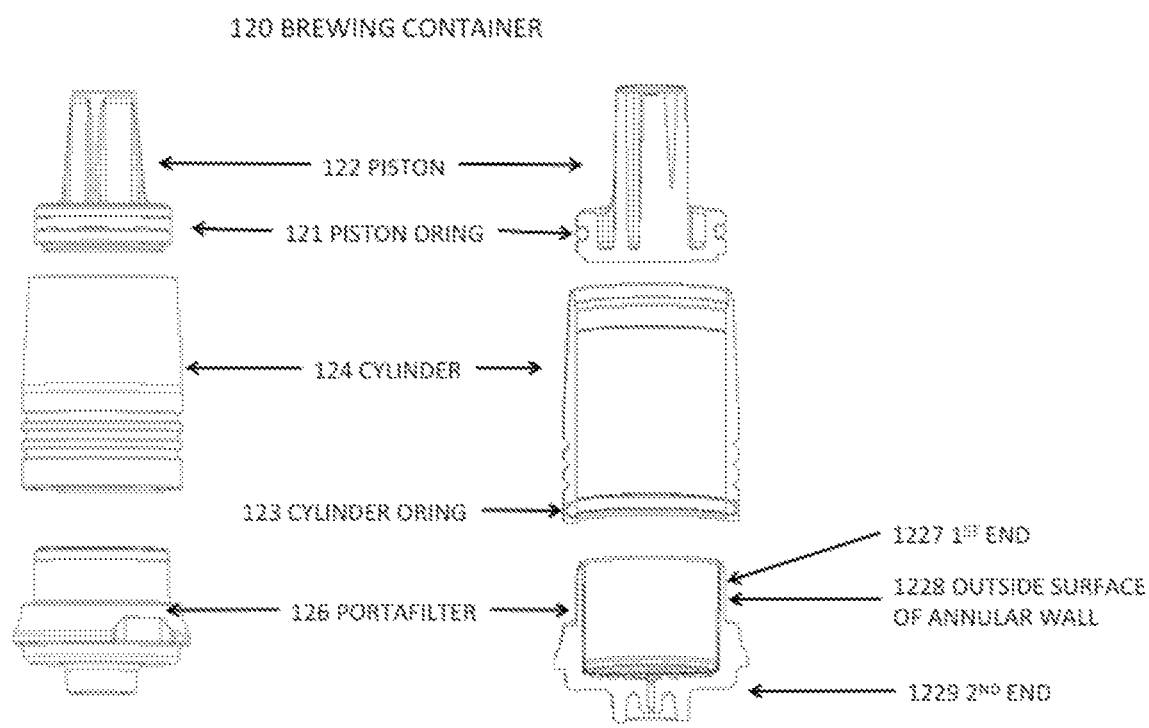
FIG. 3 illustrates a brewing container in accordance with the teachings of the present invention.

FIG. 3 illustrates the brewing container 120 that is comprised of a portafilter 126, cylinder 124, and piston 122. The brewing container 120 is formed by sliding a first end of an annular wall of the cylinder 124 onto an outside surface of a first end of an annular wall of the portafilter 126. Next the piston 122 is assembled by inserting a first end of an outer cylindrical wall of the piston 122 into an inside surface of a second end of the cylindrical wall of the cylinder 124. The cylinder 124 is configured to include a first o-ring 123 at the first end of the annular wall of the cylinder 124 that is assembled to the portafilter 126. This first o-ring 123 is configured to prevent the hot fluid 129 from leaking out of the brewing container 120 at the interface of the portafilter 126 and the cylinder 124. Next the piston 122 is configured to include a second o-ring 121 at the first end of the outer cylindrical wall of the piston 122 that is assembled to the cylinder 124. This second o-ring 121 is configured to prevent the hot fluid 129 from leaking out of the brewing container 120 at the interface of the cylinder 124 and the piston 122. The diameter of the brewing container 120 is configured to fit within the press plate.

Figure 4:
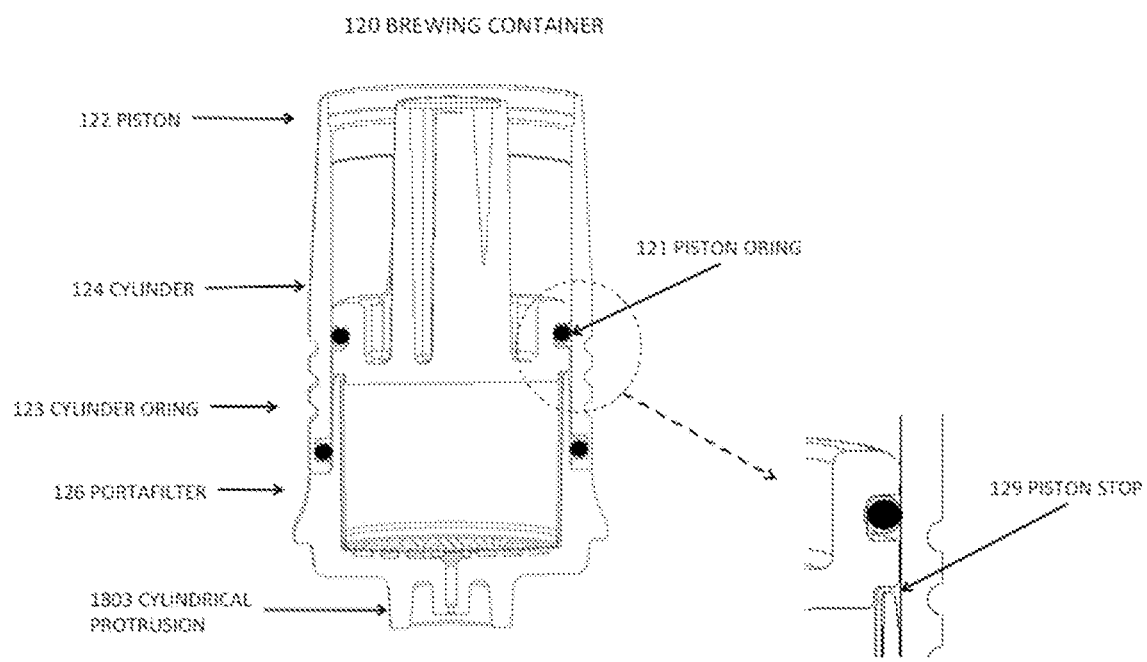
FIG. 4 illustrates a cross sectional view of the brewing container in accordance with the teachings of the present invention.

FIG. 4 illustrates a cross section of the brewing container 120 including the portafilter 126, cylinder 124, and piston 122. This figure illustrates the piston 122 after it has been pressed into the downward position. The piston 122 is stopped when the piston 122 reaches the piston stop 129, or when the piston 122 bottoms out against the portafilter 126. The piston o-ring 121 is shown compressed against the inside wall of the cylinder. The o-ring 121 fits firmly in place against the inside surface of the cylinder wall and is configured to prevent hot fluid 129 to escape as the piston 122 pushes the fluid 129 downward.

Figure 5:
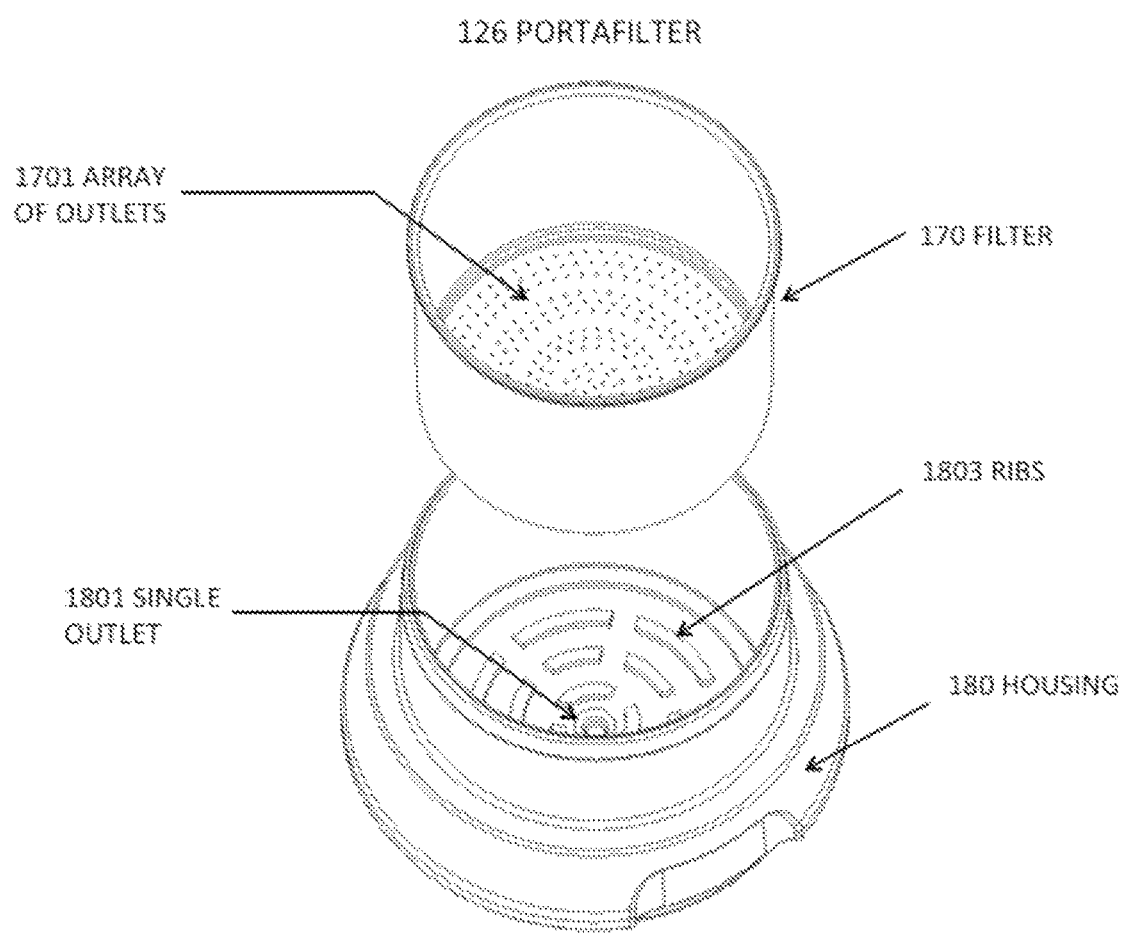
FIG. 5 illustrates a portafilter in accordance with the teachings of the present invention.

FIG. 5 illustrates the portafilter 126 comprising the filter and housing 180. The filter is made from a metal material. For example, the filter may be made from stainless steel to prevent corrosion from the exposure to the hot fluid 129 and the pre-ground brewing medium 127. The filter also includes an array of outlets 1701. The array of outlets 1701 is configured such that the hot fluid 129 can flow through the array of outlets 1701 and through the single outlet 1801 in the housing 180. The filter is configured to be inserted inside the housing 180. For example the filter may be force fit, or permanently adhered to the housing 180. The housing 180 is configured such that the filter can slide inside the housing 180 such that the outer surface of the filter slides against the inner surface of the housing 180. The housing 180 also includes ribs 1803 surrounding the single outlet 1801. The ribs 1803 are configured to hold the filter and align with the array of outlets 1701 such that the brewed fluid 1200 is able to flow out of the filter into the single outlet 1801. The ribs 1803 are positioned to support the filter in areas where there are no array of outlets 1701. The array of outlets 1701 are positioned where there are no ribs 1803 allowing the brewed fluid 1200 to freely flow out of the filter and through the single outlet 1801 in the housing 180. The housing 180 can be made from a plastic resins such as nylon, polyvinyl chloride (PVC), polyacetal, polycarbonate, and the like. Likewise the housing 180 could also be made from metals such as aluminum, stainless steel or the like. The housing 180 could be made from known manufacturing process such as extrusion, machining, 3D printing, injection molding.

Figure 6:
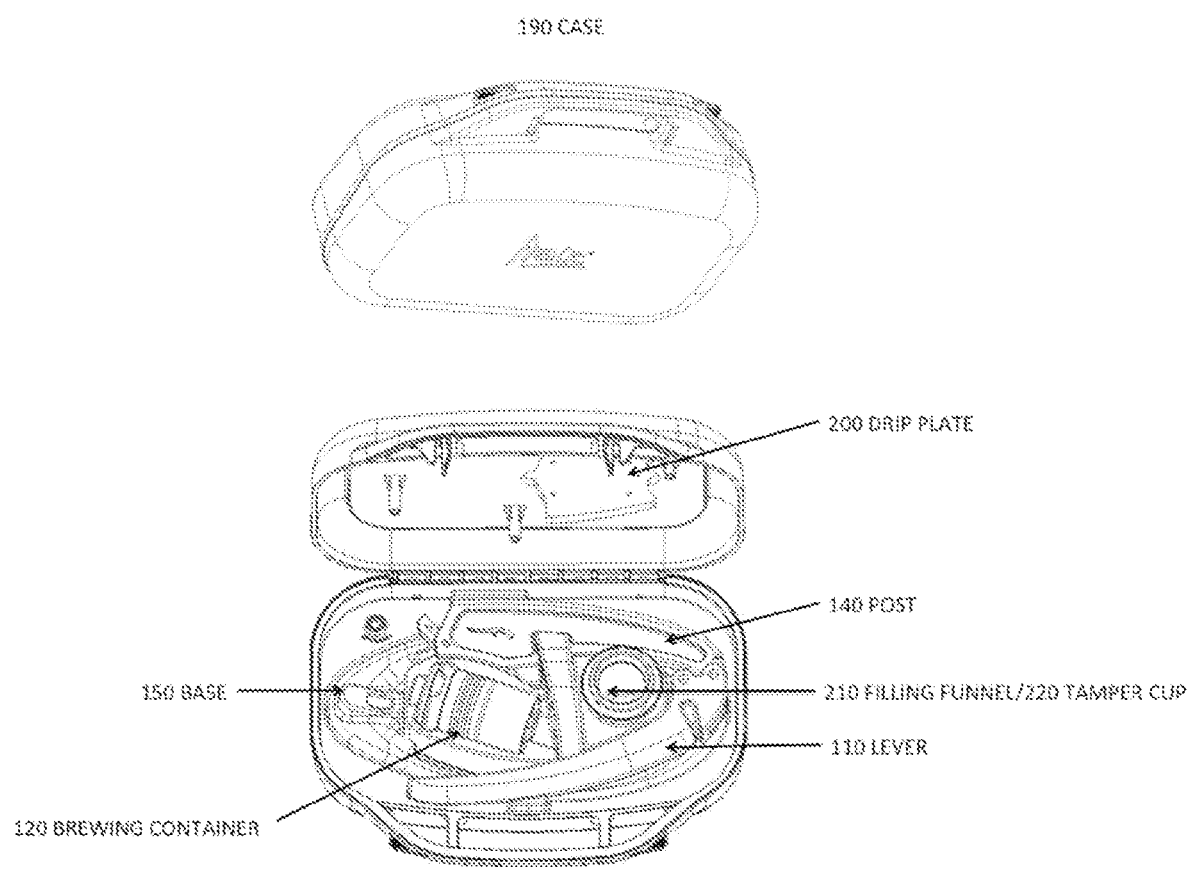
FIG. 6 illustrates a carrying case 190 in accordance with the teachings of the present invention.

FIG. 6 illustrates a carrying case 190 that is configured to house the various components of the brewing press 100. For example the drip plate 200, the base 150, the brewing container 120 (including the portafilter 126, cylinder 124, and piston 122), the post 140, the lever 110, and a filling funnel 210 and filling cup may be disassembled and arranged to fit into a relatively small and mobile sized case 190. The case 190 may be made from a plastic, polyester, wood, or metal material. The case 190 may be made from known manufacturing process such as extrusion, machining, 3D printing, and injection molding.

FIG. 7 illustrates an example of how the brewing press 100 may be shipped to a customer and removed from the case 190. For example the post 140, lever 110, and base 150 may be pre-assembled. The pre-assembled post 140, lever 110, and base 150 may be inserted into the base 150 by applying a force to mate the mating feature of the post 140 with the mating feature of the base 150. A drip plate 200 may also be assembled onto the base 150. The drip plate 200 is configured to hold any spillage of the fluid.

Figure 8:
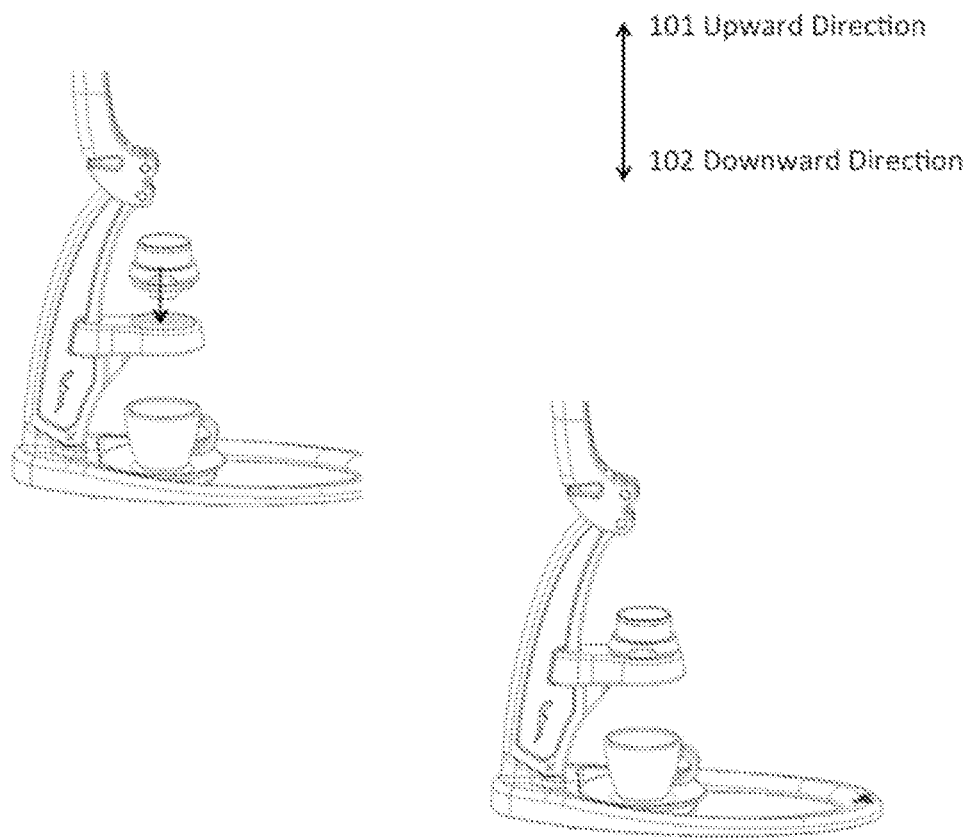
FIG. 8 illustrates a method for using the hand operated brewing press including inserting the portafilter with pre-ground brewing medium in accordance with the teachings of the present invention.
Figure 12:
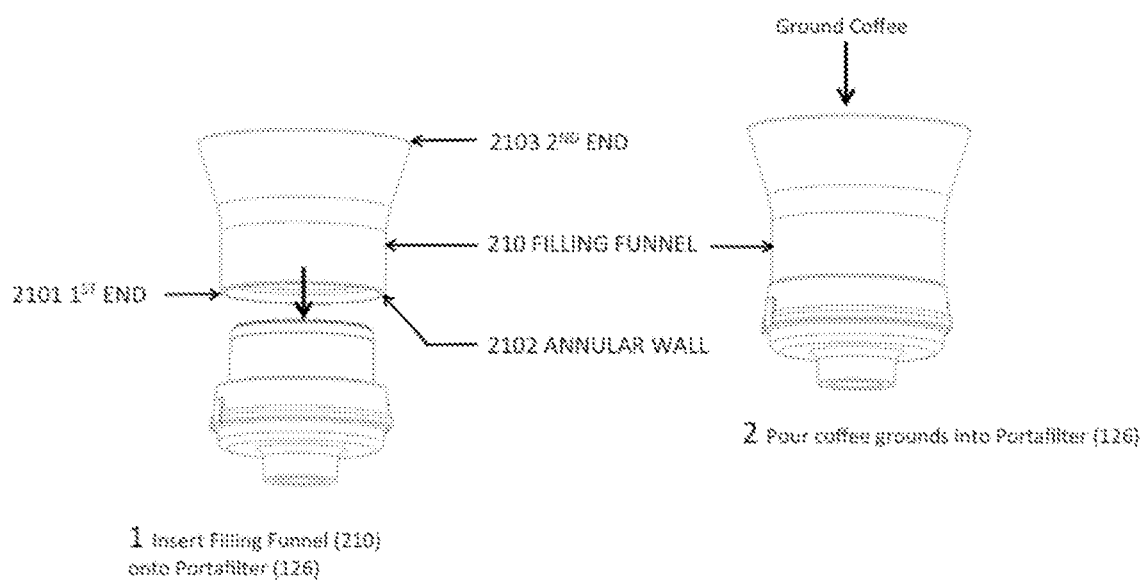
FIG. 12 illustrates a method for filling the portafilter with coffee grounds in accordance with the teachings of the present invention.
Figure 13:
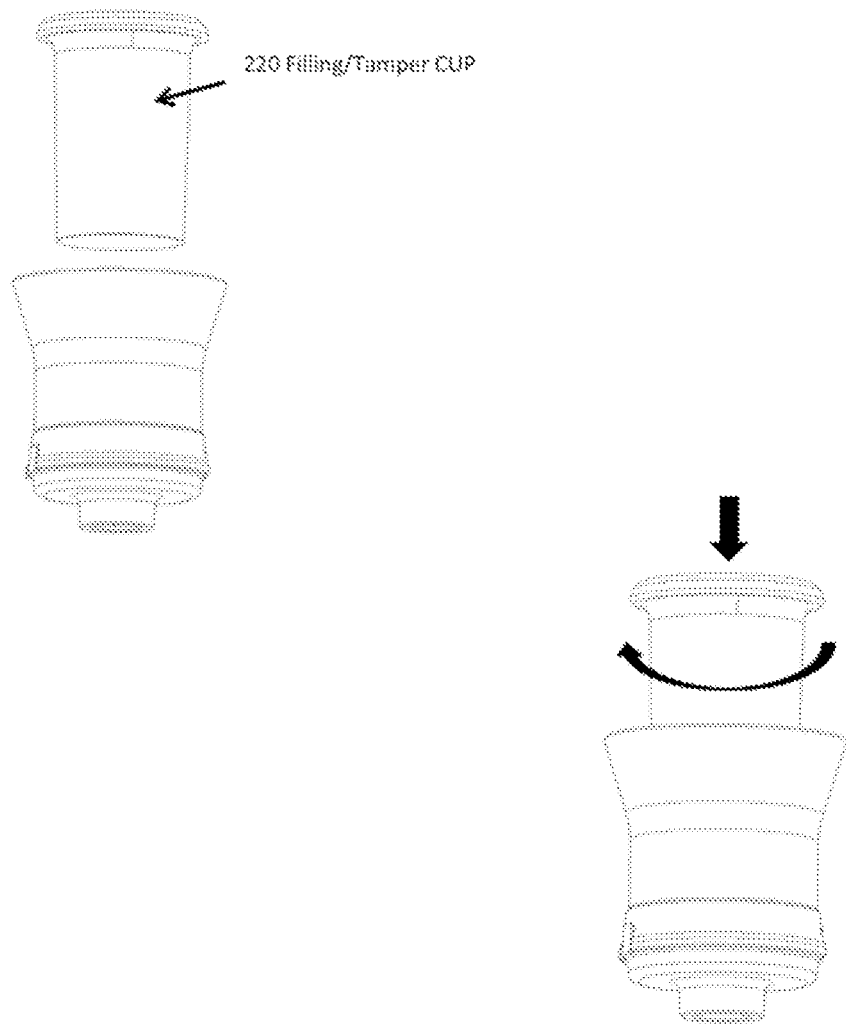
FIG. 13 illustrates a method for filling and tamping the portafilter with coffee grounds in accordance with the teachings of the present invention.

FIGS. 8-11 illustrate how the brewing press 100 can be used to brew a fluid. For example, as shown in FIG. 8, the portafilter 126 is placed on top of the base plate. As noted earlier, a protrusion on the portafilter 126 is configured to mate with a recess in the base plate. The protrusion of the portafilter 126 and the recess of the base plate are configured to enable the portafilter 126 to mate with the base plate without the need for fasteners or tools. The shape of the protrusion of the portafilter 126 and the recess of the base plate are configured to prevent the portafilter 126 from moving downward or side-to-side when a force is applied to the assembly via the lever 110. At this stage the portafilter 126 is loaded with a pre-ground brewing medium 127. For example the portafilter 126 would be filled with coffee grounds to make an espresso, or tealeaves to produce brewed tea. Any other type of a pre-ground brewing medium 127 could also be used. For example, FIG. 12 illustrates how the portafilter 126 may be filled with coffee grounds. A filling funnel 210 may be placed onto the portafilter 126 by sliding a first end of an annular wall of the filling funnel 210 onto an outside surface of a first end of an annular wall of the portafilter 126. Next a portion of coffee grounds is filled into the portafilter 126 using the filling funnel 210. The filling funnel 210 may be made of a clear or opaque material so that the fill of the coffee grounds can be visually monitored. The portafilter 126 may also include fill lines marked onto the inside surface of the portafilter 126. For example the fill lines may be marked to indicate various amounts of coffee grounds that can be put inside the portafilter 126 to vary the strength or flavor of the espresso. For example, the portafilter 126 may be configured to accommodate up to twenty (20) grams of coffee grounds. Next, as shown in FIG. 13, the portion of coffee grounds is compressed by pressing and rotating a tamper cup 220 against the coffee grounds to yield the desired portion of tamped coffee grounds. Finally the filling funnel 210 is removed from the portafilter 126.

FIG. 9 illustrates the cylinder inserted onto the portafilter 126. The cylinder is assembled by sliding a first end of an annular wall of the cylinder onto an outside surface of a first end of an annular wall of the portafilter 126. Next a hot fluid 129 is poured into the cylinder. The cylinder may include fill lines to indicate the amount of fluid 129 that should be placed inside the cylinder.

FIG. 10 illustrates the piston 122 inserted into the cylinder by inserting a first end of an outer cylindrical wall of the piston 122 into an inside surface of a second end of a cylindrical wall of the cylinder. Next a downward force is applied to the lever 110. The downward force applied to the lever 110 results in the lever 110 rotating in a downward direction 102. This causes the piston 122 to slide downward along the inside surface of the second end of the cylindrical wall of the cylinder. The downward motion of the piston 122 applies a pressure to the portion of hot water inside the cylinder. The pressure forces the portion of hot water inside the cylinder to flow into the portafilter 126 and through the portion of tamped coffee grounds to produce an espresso. The lever 110 is pressed down until the piston 122 hits the piston stop 129. The user of the brewing press 100 is able to feel the pressure through the handle as the espresso is brewed and extracted from the brewing press 100. The espresso extraction ends when the lever 110 reaches the end of the stroke (i.e. when the piston 122 hits the piston stop 129). Finally the espresso is captured in a cup 160 as the espresso flows out of the brewing container 120.

Figure 14:
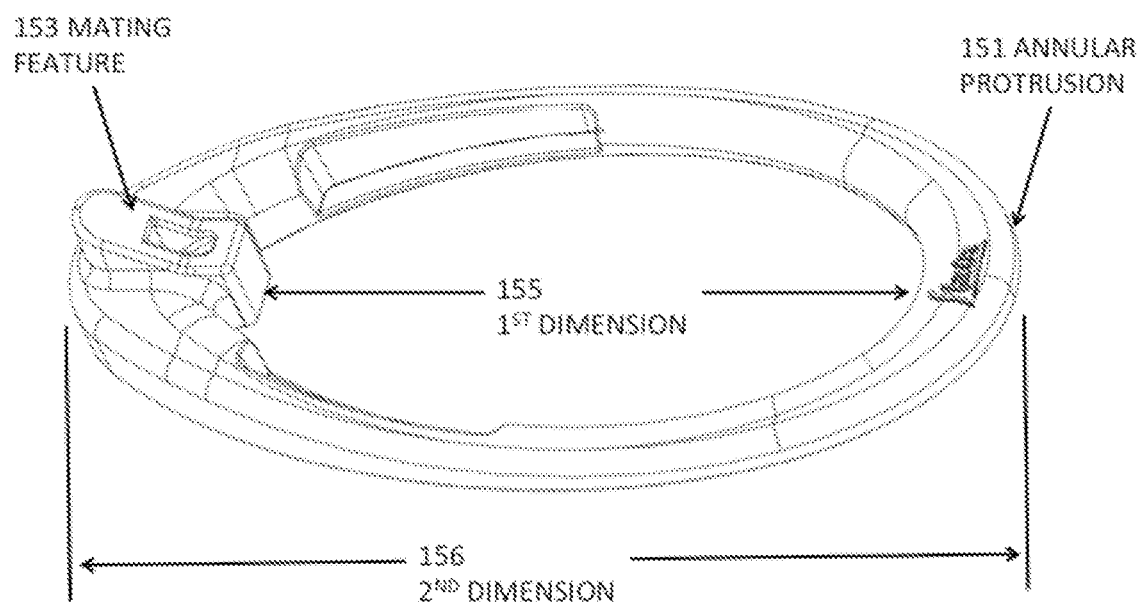
FIG. 14 illustrates a base in accordance with the teachings of the present invention.

FIG. 14 illustrates the base 150. The base 150 may be comprised from an annular protrusion formed from a solid material with a first dimension and a second dimension forming the annular ring of the protrusion. The base 150 also includes a mating feature that is configured to interface with a mating feature of the base 150. For example the mating feature may include a recess that accepts a protrusion of the base 150. Alternatively the base 150 may include a through hole at the mating feature to hold the base 150 and post 140 together (e.g. see FIG. 2). The base 150 can be made from a plastic resins such as nylon, acetal, polycarbonate, polylactic acid (PLA), and the like. Likewise the base 150 could also be made from metals such as aluminum, stainless steel or the like. The base 150 could be made from known manufacturing process such as die casting, forging, extrusion, machining, 3D printing, injection molding.

Figure 15:
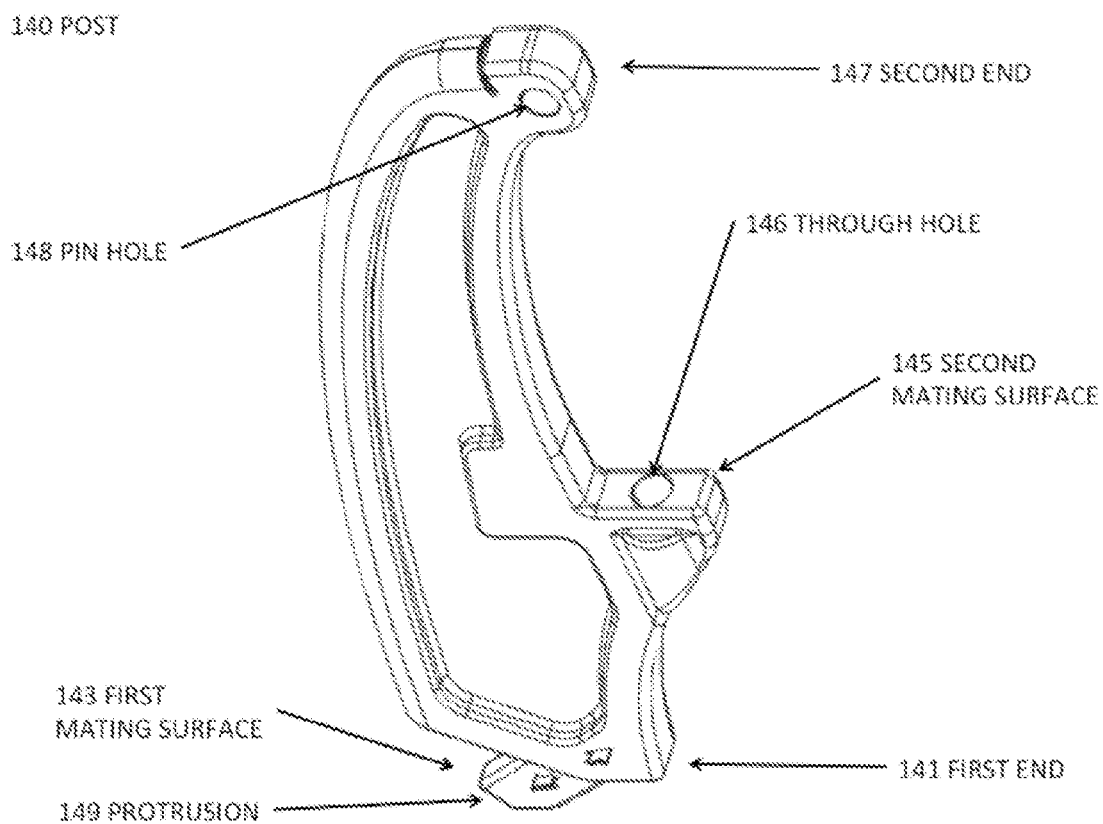
FIG. 15 illustrates a post in accordance with the teachings of the present invention.

FIG. 15 illustrates a post 140 comprising a first end, a second end, a first mating feature, and a second mating feature. The first mating feature is located at the first end of the post 140. The first mating feature may include a protrusion that is configured to mate with a recess of the base 150 enabling the base 150 and post 140 to be mated together. The second end of the post 140 includes a pinhole to enable the lever 110 to attach to the post 140 (e.g. as shown in FIG. 2). The lever 110 and post 140 may be configured to mate with a cotter pin, nut and bolt with a bearing surface, or any other type of fastener that allows the lever 110 to rotate freely about the second end of the post 140. Next the post 140 may include a second mating feature located between the first end and second end of the post 140. The second mating feature includes a through hole configured to allow the press plate 130 to be mated to the post 140. A fasteners such as a self tapping screw, bolt, or interference fitting pin may be used to hold the press plate 130 to the post 140 at the second mating surface of the post 140 (e.g. as shown in FIG. 2). The second mating feature of the post 140 is also configured such that the press plate 130 with the brewing container 120 assembled will interface with the lever 110 and such that a cup 160 can be placed underneath the press plate 130 to capture the brewed fluid 1200 (e.g. as shown in FIG. 2). The post 140 can be made from a plastic resins such as nylon, polyvinyl chloride (PVC), acetal, polycarbonate, polylactic acid (PLA), and the like. Likewise the post 140 could also be made from metals such as aluminum, stainless steel or the like. The post 140 could be made from known manufacturing process such as die casting, forging, extrusion, machining, 3D printing, or injection molding.

FIG. 16 illustrates the press plate 130. The press plate 130 is configured with a mating feature and cylindrical recess. The mating feature of the press plate 130 is configured to mate with the mating feature of the post 140, as previously described. The cylindrical recess of the press plate 130 is configured to mate with the protrusion of the brewing container 120 (e.g. as shown in FIG. 2). The press plate 130 can be made from a plastic resins such as nylon, polyvinyl chloride (PVC), acetal, polycarbonate, polylactic acid (PLA), and the like. Likewise the press plate 130 could also be made from metals such as aluminum, stainless steel or the like. The press plate 130 could be made from known manufacturing process such as die casting, forging extrusion, machining, 3D printing, injection molding.

Figure 17:
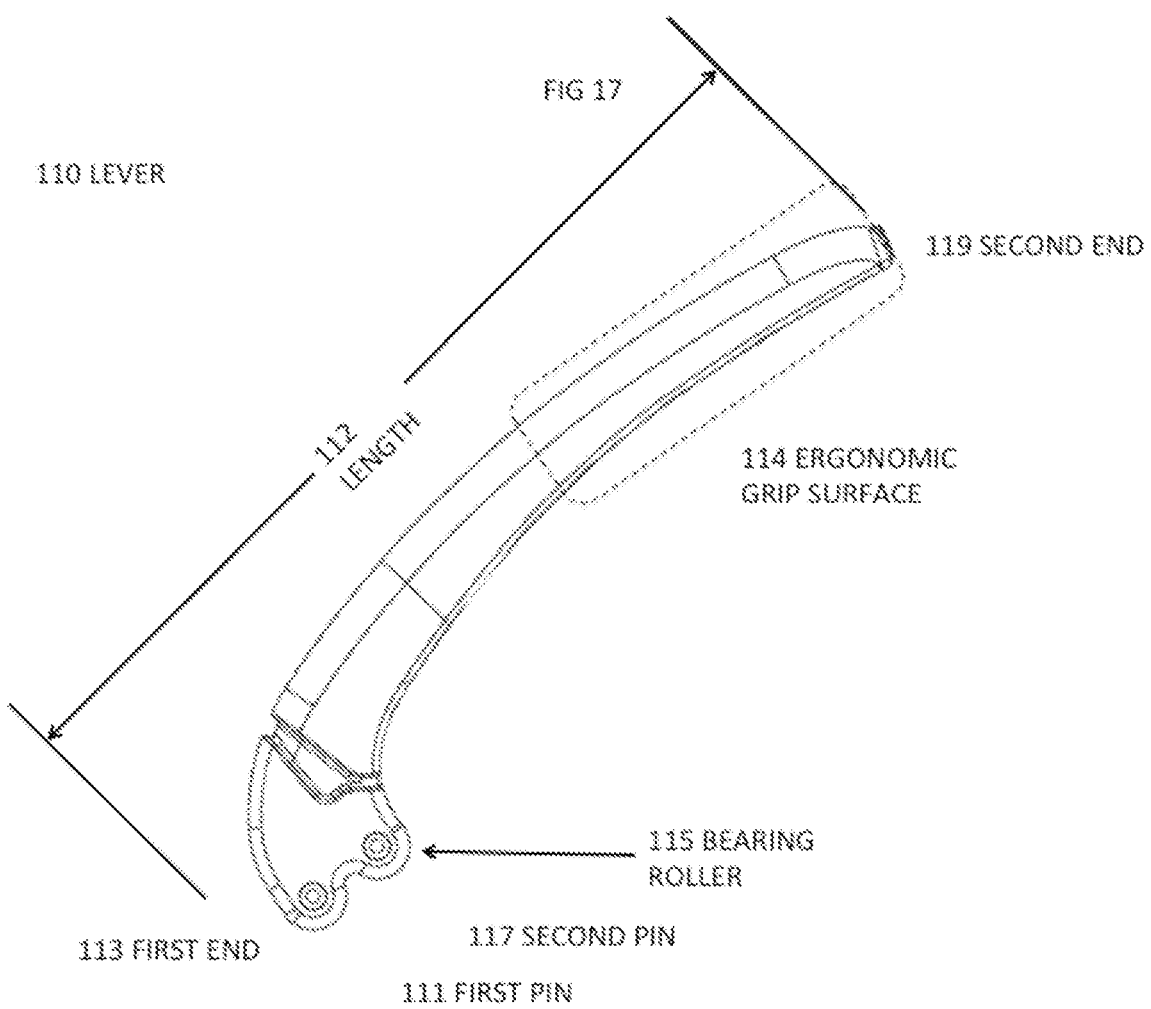
FIG. 17 illustrates a lever in accordance with the teachings of the present invention.

FIG. 17 illustrates a side view of the lever 110. The lever 110 is comprised of a first end separated by a length of material by a second end. The length of the lever 110 is configured to exert a force sufficient to yield between 8 to 20 BAR of pressure in the brewing container 120. For example the length of the lever 110 may range between 6 and 24 inches. The shape of the lever 110 may be ergonomically designed to include an ergonomically optimized cross section or grip surface. The first end of the lever 110 includes a first pin that is configured to mate with the second end of the post 140 via a pinhole to enable the lever 110 to attach to the post 140 (e.g. as shown in FIG. 2). The first end of the lever 110 includes a second pin that is configured to hold bearing roller. The bearing roller is further configured to mate with the second pin at the first end of the lever 110 wherein the bearing roller is allowed to smoothly rotate about the second pin. The bearing roller is also configured to smoothly roll against a top surface of a first end of the piston 122 when the lever 110 is rotated in a downward direction 102. The lever 110 can be made from a plastic resins such as nylon, polycarbonate, acetal, polylactic acid (PLA), and the like. Likewise the lever 110 could also be made from metals such as aluminum, stainless steel or the like. The lever 110 could be made from known manufacturing process such as die casting, forging, extrusion, machining, 3D printing, injection molding.

Figure 18:
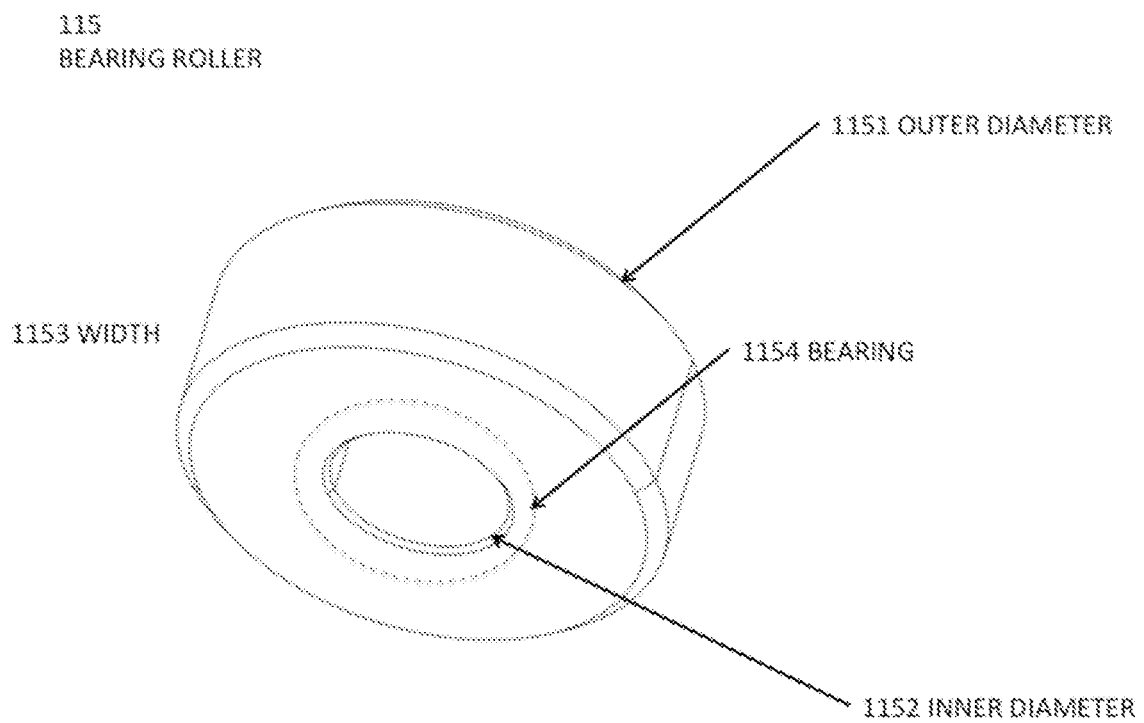
FIG. 18 illustrates a roller bearing in accordance with the teachings of the present invention.

FIG. 18 illustrates the bearing roller. The width and outer diameter of the bearing roller is configured to within the first end of the lever 110 (e.g. as shown in 2 and 17). The inner diameter of the bearing roller is configured to fit around the second pin at the first end of the lever 110 wherein the bearing roller is allowed to smoothly rotate about the second pin. The bearing roller is configured to smoothly roll against a top surface of a first end of the piston 122 when the lever 110 is rotated in a downward direction 102. The bearing roller may also include a set of bearings to enable the bearing roller to rotate freely. The bearing roller prevents the lever 110 from sticking to the top surface of the piston 122 when the lever 110 is rotated in the downward direction 102. Without the bearing roller, the friction between the lever 110 and piston 122 would cause the piston 122 to move laterally and cause the piston 122 to bind against the inside surface of the cylinder. The binding between the piston 122 and cylinder would prevent the piston 122 from freely moving in the downward direction 102 further preventing the piston 122 to force the fluid 129 to flow through the portafilter 126 and out the brewing container 120. The bearing roller can be made from any materials of hard surface and high strength that are able to bear high load applied on the top of the piston 122. The bearing roller could be made from known manufacturing process such as extrusion, machining, forging or die stamped.

Figure 19:
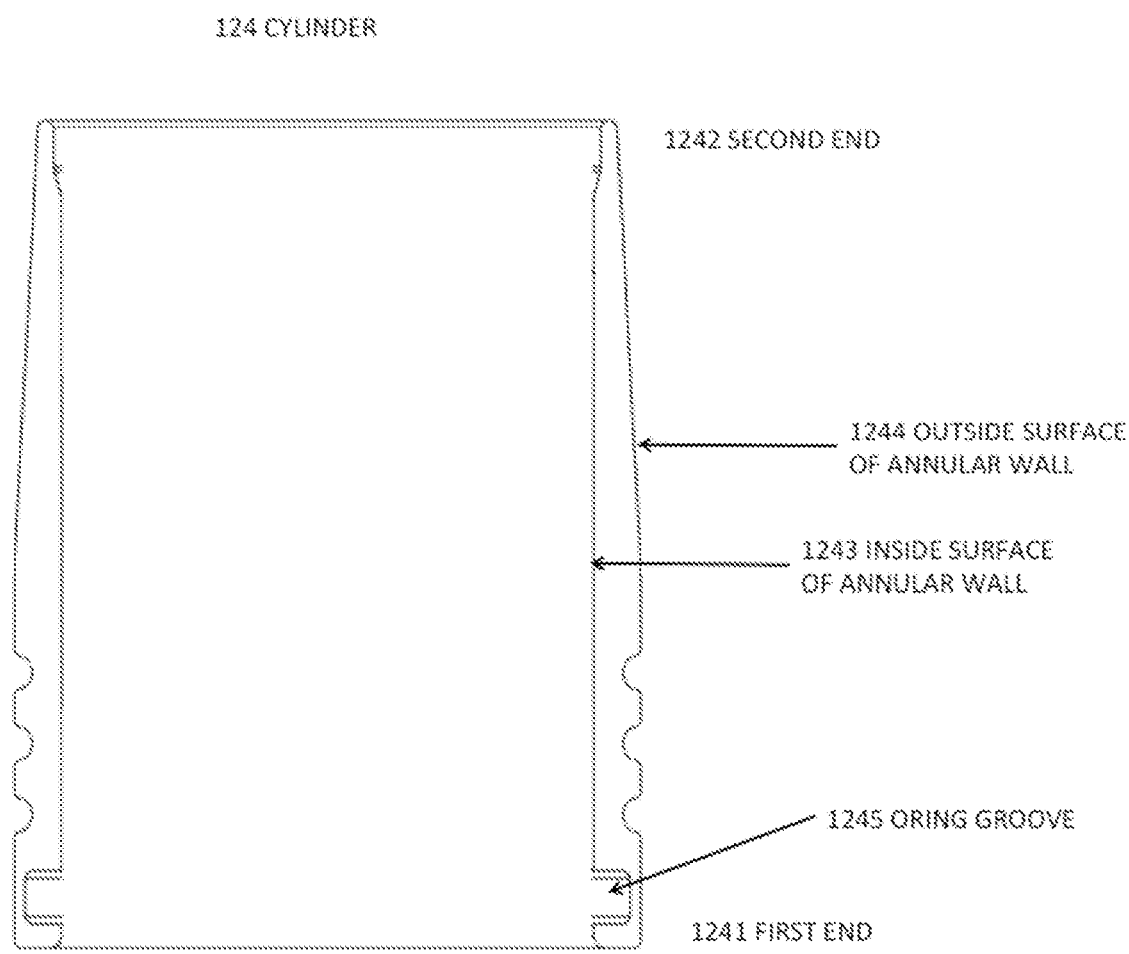
FIG. 19 illustrates a cross sectional view of the cylinder in accordance with the teachings of the present invention.

FIG. 19 illustrates the cylinder. The cylinder is comprised of an annular wall that includes an outside surface and an inside surface. The cylinder extends from a first end to a second end. The cylinder includes an o-ring 123 groove located near the first end of the surface. As previously discussed the o-ring 123 is configured to prevent fluid 129 from leaking out of the brewing container 120. The cylinder can be made from any rigid plastic resins such as nylon, polyvinyl chloride (PVC), acetal, polycarbonate and the like. Likewise the cylinder could also be made from metals such as aluminum, stainless steel or the like. The cylinder could be made from known manufacturing process such as forging, extrusion, machining, 3D printing, injection molding.

Figure 20:
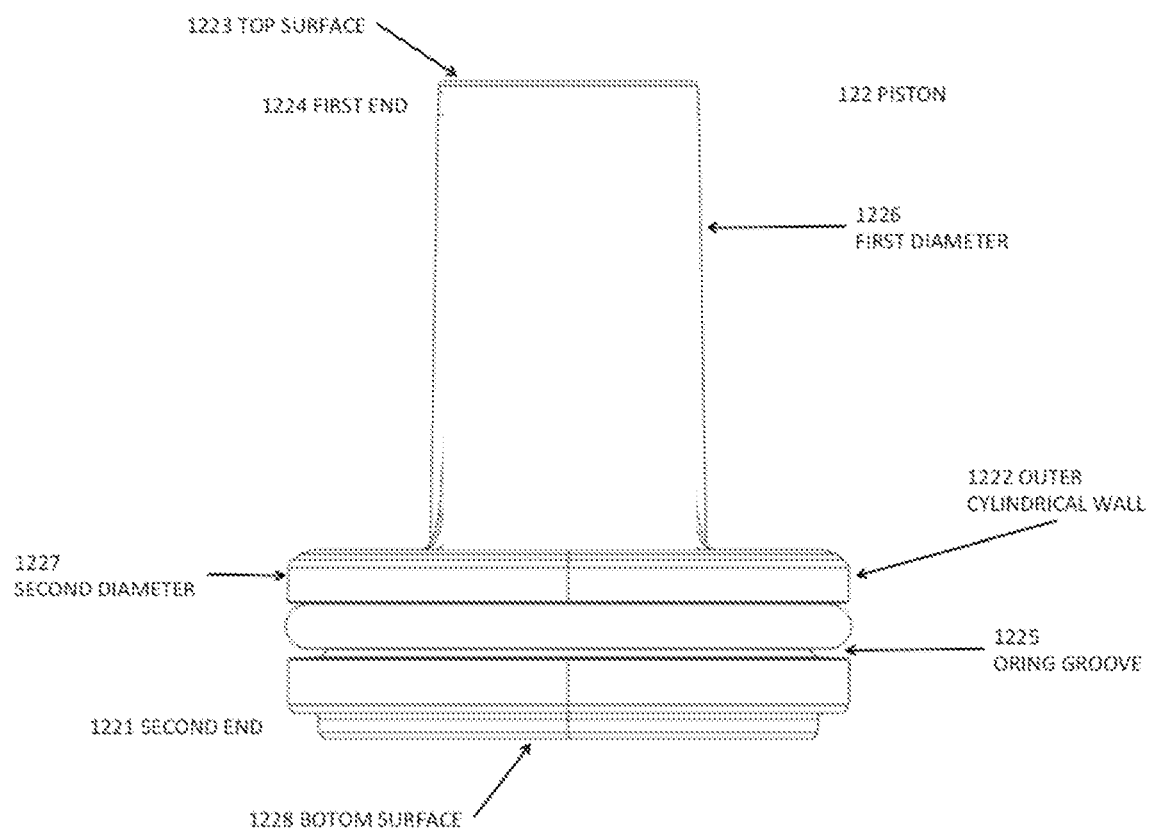
FIG. 20 illustrates a piston in accordance with the teachings of the present invention.

FIG. 20 illustrates the piston 122. The piston 122 is comprised of a first end, a second end, an outer cylindrical wall, a top surface, an o-ring groove, and an o-ring 121. The top surface of the piston 122 is configured to take the force exerted by the lever 110 when the lever 110 is rotated in the downward direction 102. The top surface of the piston 122 is also configured to allow the bearing roller to smoothly rotate against the top surface of the piston 122. For example the top surface of the piston 122 may include a hardened stainless steel surface, or other hardened material that is strong enough to take the force and provide a smooth surface for the bearing surface to roll against. The second end of the piston 122 includes an outer cylindrical wall that includes an o-ring groove configured to hold the piston o-ring 121. The first end of the piston 122 includes a first diameter. The second end of the piston 122 is formed from a second diameter. For example, the second diameter may be formed from a larger diameter than the first diameter. In another example, the first and second diameter of the piston 122 may be about the same size. The bottom surface of the piston 122 is comprised of a solid surface enabling the piston 122 to compress the hot fluid 129 and force the fluid 129 to flow in a downward direction 102 through the portafilter 126 and out of the brewing container 120.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed:

1. A hand-operated beverage press comprising:
   a press stand comprising a base, a post extending vertically from the base, a press plate extending horizontally from the post, and a lever configured to rotate about a first pin on a top end of the post; and a second pin configured to hold a bearing roller at a first end of the lever; and
   a brewing container comprising a portafilter, a cylinder, and a piston wherein the brewing container is configured to rest on the press plate and is separable from the press plate to enable cleaning, repair, and replacement;
   wherein the bearing roller is configured to smoothly rotate about the second pin and smoothly roll against a top surface of a first end of the piston when the lever is rotated in a downward direction.

2. The hand-operated beverage press of claim 1 wherein the hand-operated beverage press is configured to disassemble and the base, the post, the press plate, the lever, and the brewing container are stowable in a carrying case.

3. The hand-operated beverage press of claim 1 wherein the top surface of the first end of the piston comprises a hardened stainless steel surface.

4. The hand-operated beverage press of claim 1 wherein the piston is configured to move in a downward direction within the brewing container to compress a hot fluid within the brewing container.

5. A hand-operated espresso press comprising:
   a press stand comprising a base with a first mating feature, a post with a second mating feature configured to mate with the first mating feature of the base, a press plate configured to mate with a second mating surface of the post, wherein the second mating feature of the post is positioned between the first end of the post and a second end of the post, a lever configured to rotate about a first pin attached to the second end of the post such that a first end of the lever rotates about the first pin, a second pin configured to hold a bearing roller adjacent to the first pin at the first end of the lever wherein the bearing roller is configured to smoothly rotate about the second pin; and
   a brewing container comprising a portafilter, a cylinder, and a piston wherein the brewing container is configured to rest on the press plate and is separable from the press plate to enable cleaning, repair, and replacement;
   wherein said bearing roller smoothly rolls against a top surface of the position when a second end of the lever is rotated in a downward direction.

6. The hand-operated espresso press of claim 5 wherein a length of the lever is configured to exert a force sufficient to yield up to 20 BAR of pressure in the brewing container.

7. The hand-operated espresso press of claim 5 wherein the brewing container is configured to assemble by sliding a first end of an annular wall of the cylinder onto an outside surface of a first end of an annular wall of the portafilter, and the piston is assembled by inserting a first end of an outer cylindrical wall of the piston into an inside surface of a second end of the cylindrical wall of the cylinder.

8. The hand-operated espresso press of claim 7 wherein the cylinder is configured to include a first o-ring at the first end of the annular wall of the cylinder that is assembled to the portafilter.

9. The hand-operated espresso press of claim 7 wherein the piston is configured to include a second o-ring at the first end of the outer cylindrical wall of the piston that is assembled to the cylinder.

10. The hand-operated espresso press of claim 9 wherein the portafilter is configured to hold up to 20 grams of a portion of coffee grounds.

11. The hand-operated espresso press of claim 5 wherein the piston is configured to slide downward along the inside surface of the second end of the cylindrical wall of the cylinder to apply a pressure to a portion of hot water inside the cylinder.

12. The hand-operated espresso press of claim 11 wherein the portion of hot water inside the cylinder is forced to flow into the portafilter through a portion of coffee grounds to produce an espresso.

13. The hand-operated espresso press of claim 12 wherein the espresso flows through an array of outlets in a filter of the portafilter and then out of a single outlet in a housing of the portafilter and into a cup.

* * * * *